United States Patent [19]

Cooper et al.

[11] Patent Number: 5,035,526
[45] Date of Patent: Jul. 30, 1991

[54] CONCEALED RIVET ELEMENT AND SETTING METHOD FOR RING BINDER CONSTRUCTION

[75] Inventors: Edward W. Cooper; Peter Dewberry, both of Scarborough, Canada

[73] Assignee: Acco World Corporation, Wheeling, Ill.

[21] Appl. No.: 582,688

[22] Filed: Sep. 13, 1990

Related U.S. Application Data

[63] Continuation-in-part of Ser. No. 349,017, May 8, 1989, abandoned.

[51] Int. Cl.⁵ .............................................. B42F 13/00
[52] U.S. Cl. ........................................ 402/75; 24/95; 29/243.521; 246/37.1
[58] Field of Search ..................... 24/94, 95; 296/37.1; 29/243.52; 402/75, 80 R

[56] References Cited

U.S. PATENT DOCUMENTS

| 340,117 | 4/1886 | Holt | 24/95 |
|---|---|---|---|
| 494,542 | 4/1893 | Beaumont | 24/95 |
| 496,357 | 4/1893 | Hall | 24/95 |
| 3,494,246 | 2/1970 | Hensley | 24/95 X |
| 3,745,613 | 7/1973 | Daddona, Jr. | 24/95 X |
| 4,138,779 | 2/1979 | Weber | 29/243.52 |
| 4,295,747 | 10/1981 | Erichiello | 402/75 |
| 4,522,442 | 6/1985 | Tarenara | 296/37.1 |
| 4,722,628 | 2/1988 | Rager | 402/75 |

Primary Examiner—Paul A. Bell
Attorney, Agent, or Firm—Pennie & Edmonds

[57] ABSTRACT

A multi-element product and the method of making it which product is held together by a rivet. The product includes a hard layer adjacent a compressible soft layer to form a composite. A hole in the hard layer receives an anvil which is urged into the compressible layer. The rivet, which may be carried to its drivable position by a projection, is driven against the anvil to deform the rivet end.

7 Claims, 4 Drawing Sheets

CONCEALED RIVET ELEMENT AND SETTING METHOD FOR RING BINDER CONSTRUCTION

RELATED APPLICATIONS

This application is a continuation-in-part of U.S. Application Ser. No. 07/349,017 entitled "Concealed Rivet Element And Setting Method For Ring Binder Construction And The Like" filed May 8, 1989, now abandoned.

BACKGROUND OF THE INVENTION

It has been known that rivets having portions protruding from the spine (and visible when the folder is closed) have been used.

In addition, binder folders in which the rivets or other fasteners for holding the ring binder mechanism to the binder spine do not protrude from the spine are old (U.S. Pat. Nos. 4,295,747; 4,522,442; and 4,722,628).

Anvils which remain attached to the spine or other workpiece include the button construction shown in U.S. Pat. Nos. 496,357 and 3,745,613 and the rivet construction in U.S. Pat. No. 3,494,246. Anvil means attached to a fastener for accomplishing embedding the fasteners in composite boards has also been proposed (U.S. Pat. No. 4,138,779).

SUMMARY OF THE INVENTION

Broadly, the present invention relates to a multi-element product held together by a rivet and the method of making the multi-element product comprising the steps of providing a hard layer adjacent a compressible soft layer to form a base composite, forming a hole in the hard layer, positioning an anvil in such hole and thereafter embedding the anvil in the compressible layer. A third component is then secured to the hard layer by inserting a rivet (having a head at one end and a deformable portion at the other end) through an opening in the third component and thereafter applying a force to the head to deform the deformable rivet portion as it is driven against the anvil until such portion is larger than the hole in the hard layer and is not removable through the hole of the base composite due to the interference of the hard layer. The hard layer of the composite may be a metal sheet.

It is a feature that the product of the method is a rivet with its end, as deformed in the soft layer, is not visible from the side of the compressible layer opposite the hard layer of the base.

It is a further feature of the invention that the base composite may be a composition board and metal sheet lamina for use as a spine for a ring binder book with one or more rivets holding the ring mechanism affixed to the metal layer in accordance with the present invention.

DESCRIPTION OF THE PREFERRED EMBODIMENT

Figure 1:
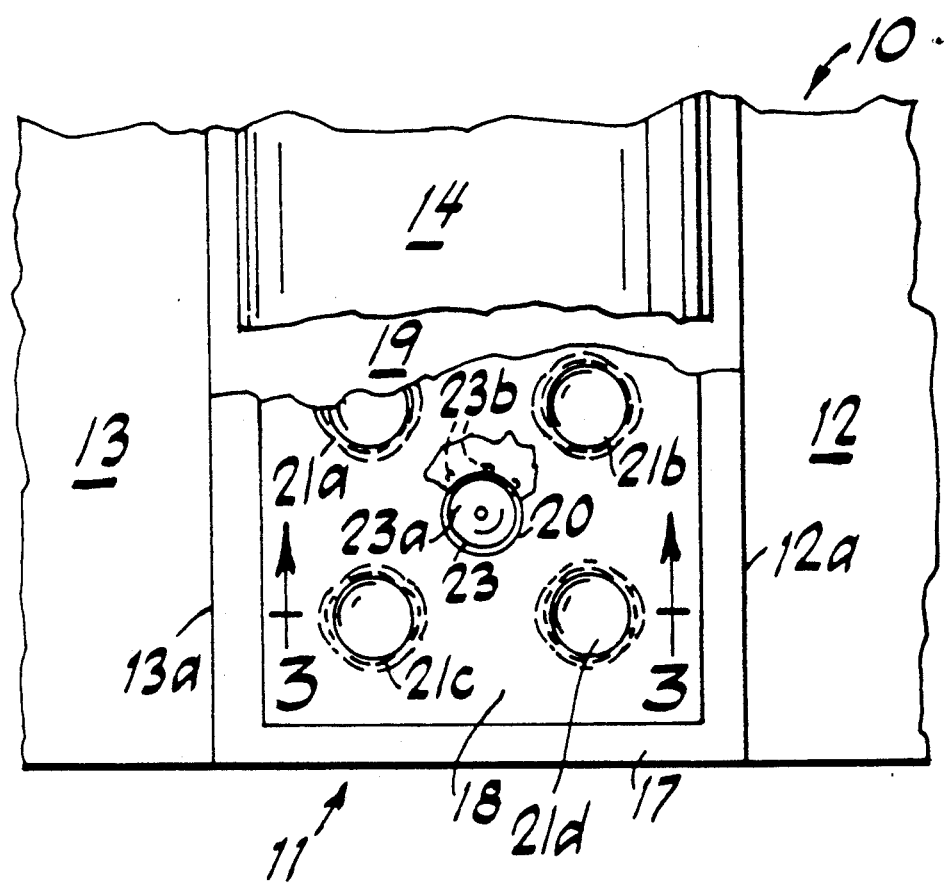
FIG. 1 is a top plan view of a ring binder including spine, cover and arched metal casing embodying the invention partially cutaway with an upstanding rivet exposed and further cutaway showing the rivet end deformed.

In FIG. 1 ring binder 10 includes spine 11, covers 12, 13, swingable about hinges 12a, 13a and curved binder metal casing 14. Spine 11 is a laminate comprising an outside vinyl sheet 15 (not shown in FIG. 1), a composition fibrous board 17, a metal plate 18 and an inside vinyl sheet 19. Also shown are four (4) nail bursts 21a, b, c, and d in metal plate 18, round rivet-receiving hole 20 in the plate 18 and rivet 23 having head 23a and deformed rivet end sectors 23b. Nail bursts 21a–d may be formed with any suitable drivable instrument including a nail. Metal plate 18 may be made of any material which will resist withdrawal of rivet 23 under normal conditions of operation once driven and set.

Figure 2:
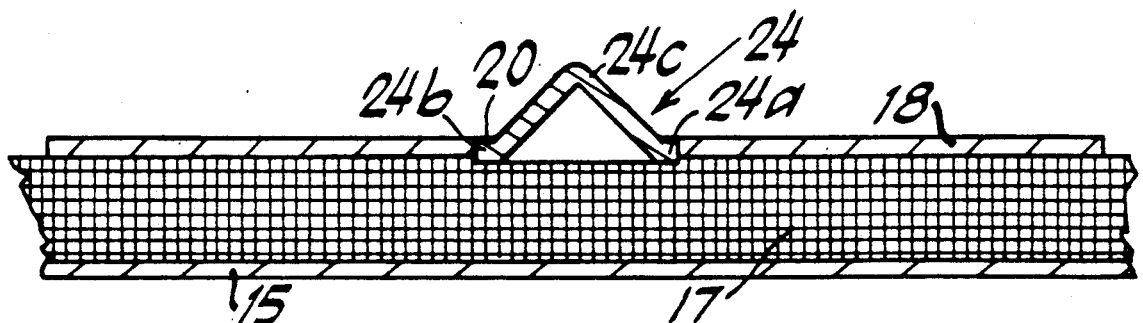
FIG. 2 is a sectional view showing the anvil positioned in the hole in the metal sheet and resting on the upper surface of the soft compressible layer.
Figure 2A:
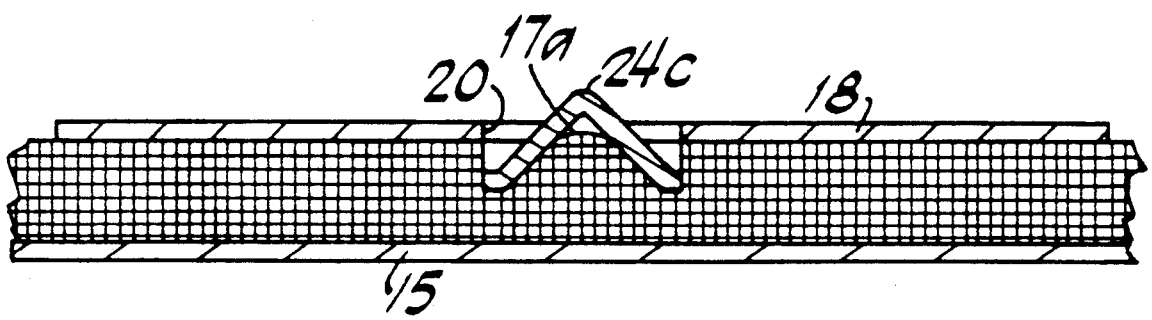
FIG. 2a is a view similar to FIG. 2 with the anvil set down into the soft compressible layer.

Turning to FIGS. 2 and 2a, anvil 24 including horizontal feet 24a, b and crown 24c positioned in hole 20 of plate 18 (FIG. 2). After anvil 24 has been driven down into board 17 a compressed portion 17a of board 17 is forced up into the under side area of rivet crown 24c. Also shown is lower vinyl sheet 15. Plate 18 is preferably metal but may be made of any hard material while board 17 should be made of a soft material such as paper or wood composites.

Figure 3:
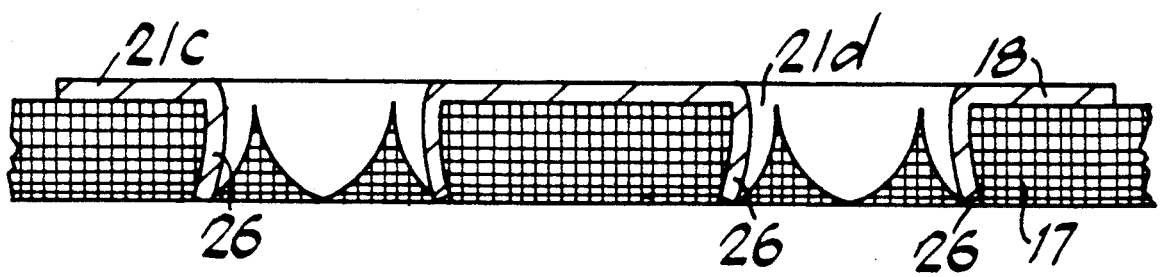
FIG. 3 is a sectional view taken along line 3—3 of FIG. 1.

FIG. 3 shows the nail bursts 21c and 21d having bend-down sheet clinching fractures 26 which function to engage metal sheet 18 with board 17.

Figure 4:
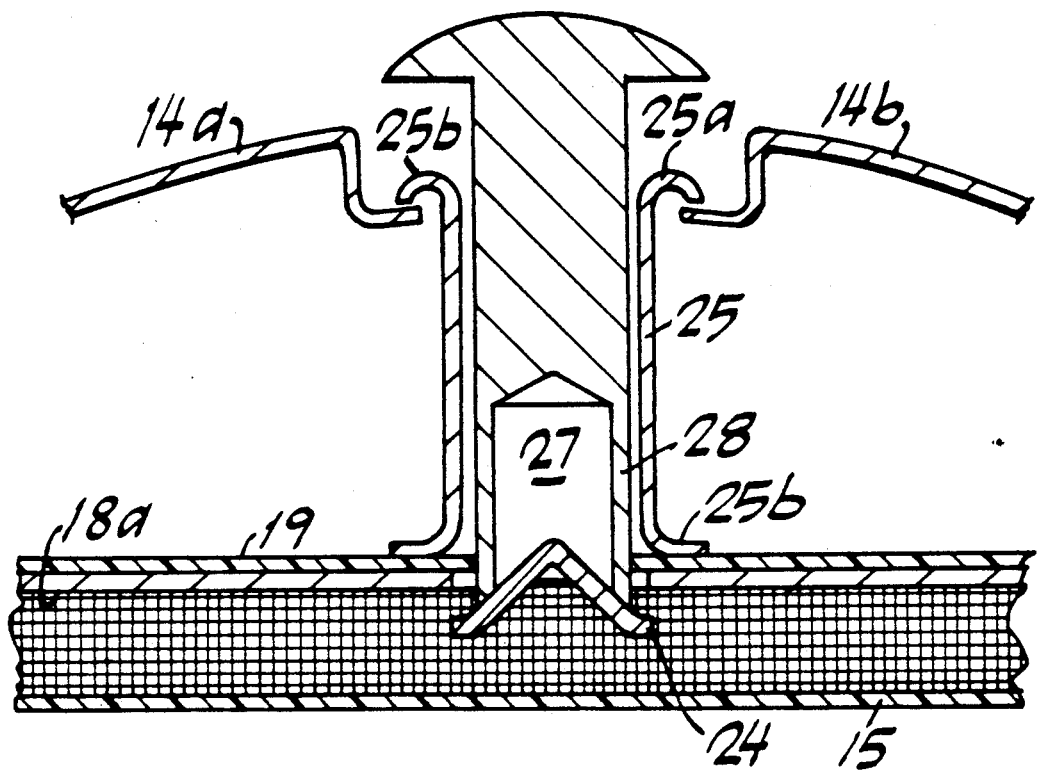
FIG. 4 is an enlarged sectional view with a rivet resting on the anvil prior to being driven downward.
Figure 5:
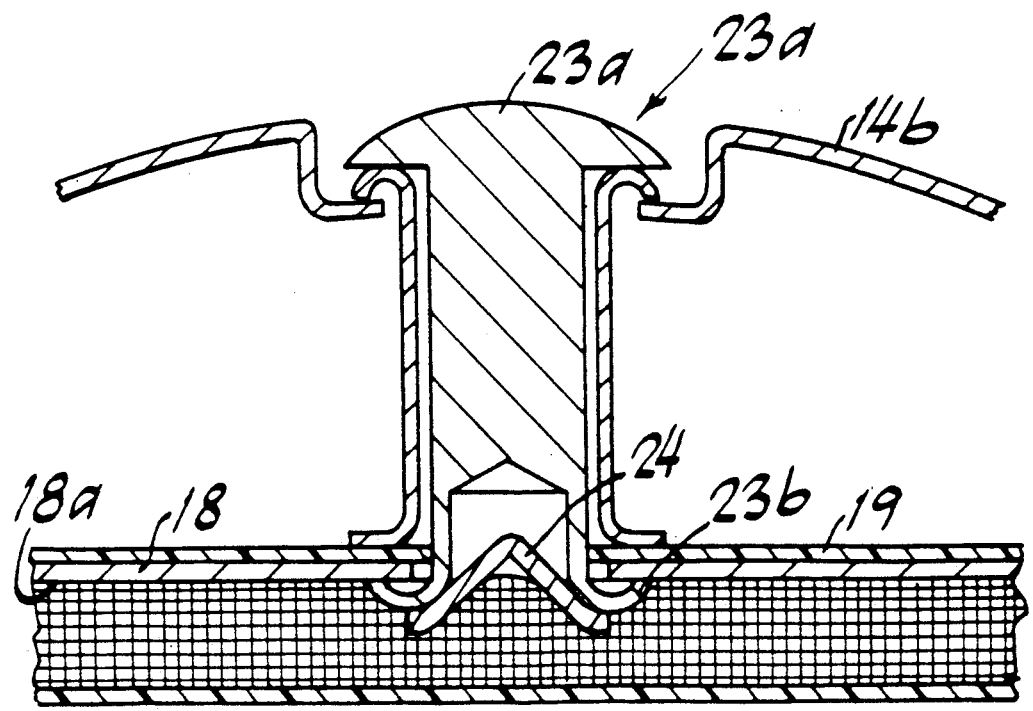
FIG. 5 is a sectional view similar to FIG. 4 with the rivet driven downwardly to deform its lower end.

Turning to FIGS. 4 and 5, curved metal casing 14 is constructed of cover pieces 14a and 14b and hold-down braces 25. Braces 25 include upper hooks 25a and feet 25b. Rivet 23 has internal cavity 27 which permits cylindrical rivet skirt 28 to fracture and curl to form deformed rivet sectors 23b (see FIGS. 1 and 5) to hold and anchor rivet 23 between anvil 24 and the underside 18a of plate 18. Also shown are upper and lower vinyl sheets 15, 19. Board 17 is preferably of sufficient thickness such that anvil 24 is spaced from the board's outer surface after deformation of rivet 23. The outer surface of board 17 is the lower surface as shown in FIGS. 4a and 5. Since rivet 23 does not penetrate through board 17 sheet 15 is not required for cosmetic or other reasons.

Figure 6:
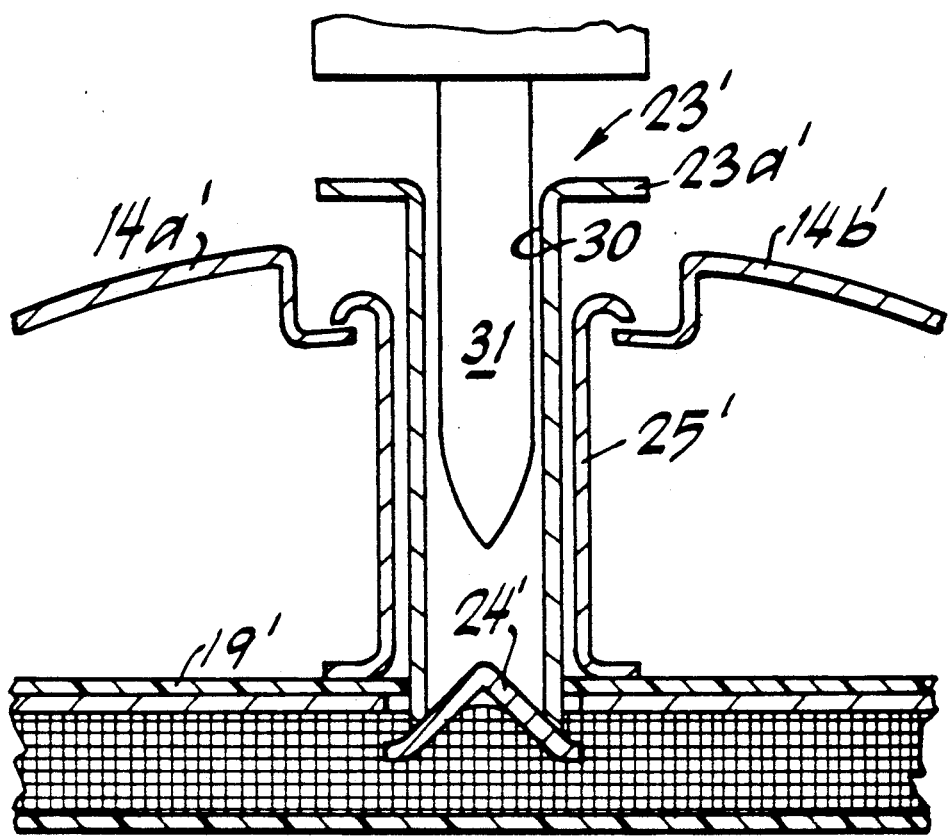
FIG. 6 is a view similar to FIG. 4 showing an alternative embodiment.
Figure 7:
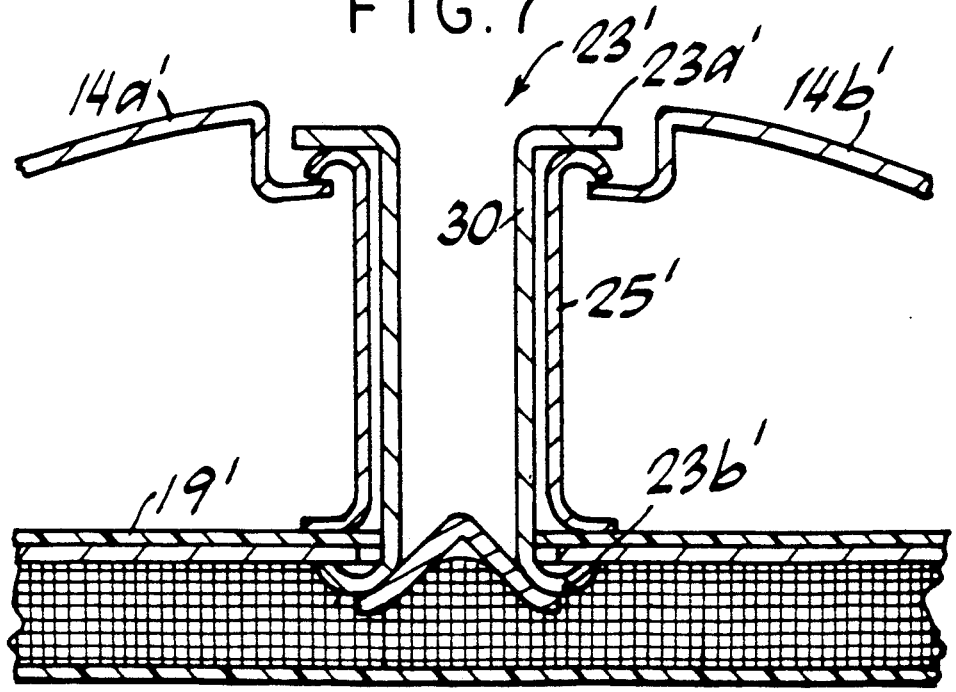
FIG. 7 is a view similar to FIG. 5 showing the alternative embodiment.

Finally, FIG. 6 shows an alternative embodiment in which rivet 23' has an internal elongated recess 30 throughout its length. Elongated recess 30 can accommodate a locating pin 31 to guide rivet 23' to the position on anvil 24' shown in FIG. 6. Locating pin 31 is part of the assembly apparatus which delivers rivet 23' to the location on anvil 24' for driving and deformation. Rivet 23' has a ring-shaped head 23a'. Also shown are hold-down braces 25', cover pieces 14a', 14b' and vinyl sheet 19'. FIG. 7 shows the rivet 23' after pin 31 is removed and after driving during which rivet 23' is deformed to create rivet sections 23b'.

We claim:

1. In a ring binder having a spine and a ring mechanism, the improvement comprising a spine with an inside hard layer with a hole formed in it, an outside adjacent soft layer, and a fastener means for fastening the spine to the ring mechanism which fastener means includes an integrally formed head, stem and deformable end fastener element and an anvil located in the soft layer below said hole in the hard layer, the fastener element driven against the anvil to deform its end to the extent it is not able to pass through the hole.

2. The ring binder of claim 1 in which the soft layer has outside and inside surfaces and in which the anvil after the fastener element has been deformed is located spaced from the outside surface.

3. A multi-element article having a base element and an adjacent element having fastener means for urging the adjacent element against the base element, the improvement comprising
   a. a layered base element having a layer adjacent the adjacent element;
   b. an anvil located in and forming a part of the base element;
   c. the fastener for fastening the base element to the adjacent element, said fastener including a head, a stem, and a deformable end opposite the head integrally formed with the stem, said end opposite the head being shaped so that it is deformable;
   d. an opening in the adjacent element for permitting engagement of the fastener head after the fastener has been deformed by driving it against the anvil to grip the base element.

4. The multi-element article of claim 3 in which the fastener has an elongated recess therein for assisting in locating the fastener during its assembly.

5. A method of setting a rivet having a head, stem and deformable end with said head, stem and end integrally formed with the deformable end for engagement with a layered element comprising
   a. providing an element having an upper layer, a hole in the layer and a recess below such hole;
   b. placing an anvil in such recess;
   c. inserting the rivet partially into the recess with the integral deformable end against the anvil; and
   d. driving the rivet against the anvil until the deformable end is so deformed that it cannot be removed from the recess by passing it through the layer hole.

6. The method of setting a rivet of claim 5 in which the step of inserting includes moving a projection adjacent the anvil to deliver the rivet and thereafter removing the projection.

7. The method of claim 6 in which the layered element is the spine of a ring binder.

* * * * *